Patented Dec. 13, 1927.

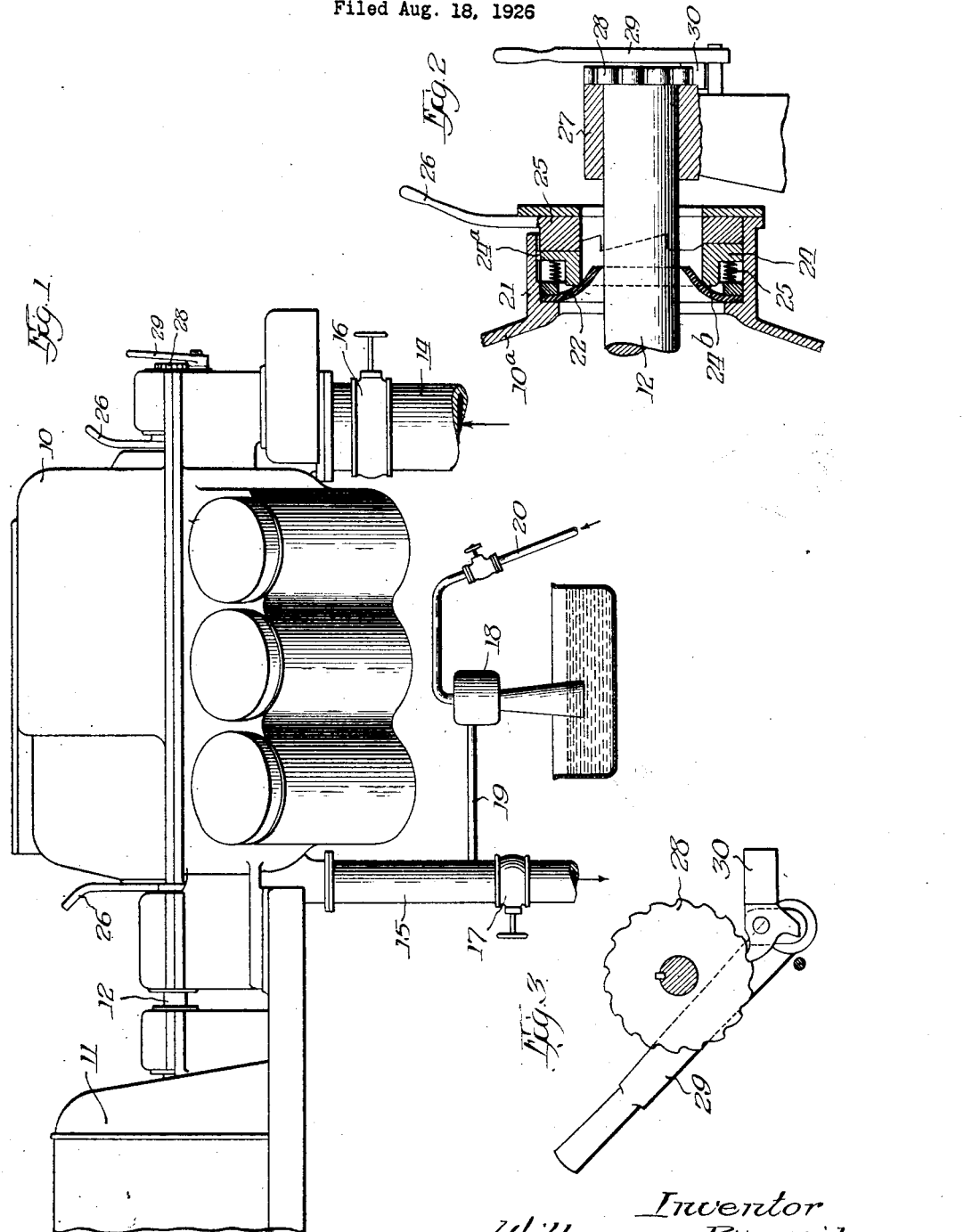

1,652,747

UNITED STATES PATENT OFFICE.

WILLEM van RIJSWIJK, OF ENNETBADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

COMPRESSOR APPARATUS.

Application filed August 18, 1926, Serial No. 129,966, and in Germany July 2, 1925.

This invention relates to rotary compressors or blowers, and is of particular utility as applied to compressors or blowers which are driven by electric motors.

A general object of the invention is the provision of an arrangement for facilitating the starting of rotary compressors, so that the driving motors will not be required to develop excessive torque at starting.

An ancillary object is the provision of an arrangement which will decrease the cost of rotary compressor installations by permitting the use of electrical motors of the synchronous or squirrel cage types.

Other objects will be pointed out or indicated hereinafter, or will be apparent to one skilled in the art upon an understanding of the invention.

In the accompanying drawing is shown one arrangement in which the invention may be embodied, but the same is presented for illustration only, and is not to be interpreted as limiting the claims short of the true and most comprehensive scope of the invention in the art.

In the drawing,

Fig. 1 is a part side elevational view of a rotary compressor installation, showing the compressor direct connected to an electric motor;

Fig. 2 is a sectional elevation illustrating a gland closing arrangement and starting mechanism, and Fig. 3 is a side elevational view of the starting mechanism.

Electric motors of the synchronous or squirrel cage induction types possess certain advantages which are highly desirable for the operation of rotary compressors. In the first place, they are relatively simple and economical types of motors, and thus contribute to reduction of cost of the installation. In the second place, since a rotary compressor is a constant speed machine, economical and efficient operation at the rated speed may be most conveniently attained with motors of those types. However, the starting of rotary compressors, particularly those of substantial size, involves the accelerating of heavy masses, and thus imposes on the driving motor requirements which motors of the induction or squirrel cage types are not qualified to meet. The synchronous motor, for example, must be started under greatly reduced excitation, and has a very low starting torque, while squirrel cage motors, when starting under load, draw very heavy currents, in amounts likely to exceed the permissible loading of the supply mains or the amount allowed by the power companies. The present invention makes possible the use of motors of these types, with the attendant advantages of economy, robust construction and good power factor, by enabling the compressor to be started by such motors at their starting torques and without excessive demands on the current supply.

The nature of the invention will be ascertained at once by reference to the illustrative embodiment wherein the reference character 10 designates generally a compressor which is driven by a motor 11, which may be of the induction or squirrel cage induction type, the rotors of the compressor and the motor having direct connection through the shaft 12. The intake of the compressor is designated 14, and its outlet 15, and valves 16 and 17 are provided whereby both the intake and the outlet may be closed. As a means for reducing the resistance to starting of the compressor, I provide an arrangement for exhausting or partially exhausting the air from the compressor casing. Such means is illustrated by the ejector pump 18 which is connected to the outlet 15 between the valve 17 and the casing, by the pipe 19. The pipe 20 supplies the actuating fluid to the ejector pump 18, whereby the air is withdrawn from the compressor casing. In order to aid in the exhausting of air from the casing, and to hold the partial vacuum, I provide sealing glands for the casing about the shaft 12, a form being illustrated in Fig. 2. In this illustration the compressor casing is designated 10$^a$ and is provided with a sleeve 21 encircling the shaft. In this sleeve is mounted a flexible disk or gasket 22 which normally encircles the shaft loosely. A cam collar 24 is mounted in the sleeve 21 for sliding movement axially of the shaft, being held against rotation by engagement of a lug 24$^a$ in a groove in the sleeve. Springs 25 urge the cam collar 24 away from the gasket 22, but the cam collar has an annular portion 24$^b$ adapted for engagement with the gasket 22 so that, upon inward movement of the cam collar, the gasket will be compressed against the shaft, forming a relatively tight seal against the ingress of air. On its outer side the cam collar 24 has wedge faces for cooperation with complementary wedge faces of the cam ring 25. The cam ring is mounted for rotation in the sleeve 21, and may be rotated by means of the lever 26 to wedge the cam collar 24 inwardly for the purpose above mentioned. In this fashion the compressor casing may be closed in an effective manner to permit the exhausting of the air from it by the exhausting device 18. It is to be noted that the gasket or sealing element 22 acts in the nature of a valve, and that due to the outward flexure of the gasket the inner edge thereof seats on the shaft with the pressure exteriorly of the compressor casing so that when the gasket is flexed to a greater degree into sealing position, in the manner explained, such pressure provides further for the holding of the gasket into close sealing relation with respect to the shaft.

For overcoming the static inertia of the compressor shaft and rotor, a simple starting mechanism may be supplied. Such a device is illustrated in Figs. 2 and 3. In association with one of the bearings 27 of the shaft 12, there is mounted on the latter a ratchet wheel 28, and a cooperating ratchet lever 29 is pivotally mounted on the bearing pedestal for oscillation on an axis 29ª, past the end of the shaft and the ratchet wheel. The ratchet lever carries the ratchet dog 30 for engagement with the teeth of the ratchet wheel 28 so that, by manual oscillation of the lever 29, the shaft 12 may be given its initial rotation, the lever 29 and dog 30 cooperating with the ratchet wheel in the manner of a feeding device.

For starting the compressor from standstill, the compressor casing is first closed by closing the valves 16 and 17 and the shaft glands in the manner explained above, then the exhausting device is set in operation and the air withdrawn from the casing. Then by operation of the starting mechanism, the shaft is given initial rotary movement, whereupon the motor may be switched in and the machine brought up to speed with the normal starting torque of the motor. Thus simple motors of the induction or squirrel cage induction types are rendered available for the operation of rotary compressors. After the compressor has been brought up to speed the valves 17 and 16 are opened, the exhausting device 18 turned off, and the cam ring 25 reversed to permit the cam collar 24 being retracted and the shaft freed from the constraint of the gasket 22.

What I claim is:

1. The combination with a gas compressor having a casing enclosing a rotor with its drive shaft passing through the casing, of an adjustable gland for forming a seal between the shaft and casing to prevent ingress of atmosphere, and means for exhausting contained gases from the casing while the rotor is stationary.

2. The combination specified in claim 1, together with a motor for driving the rotor and means for starting the rotor independently of power from the motor.

3. The combination with a gas compressor having a casing containing a rotor and provided with inlet, outlet and shaft openings, of means for closing said openings to prevent ingress of fluid therethrough, and means for exhausting contained gas from the casing while the rotor is stationary.

4. The combination with compressor apparatus including a casing, an operating shaft disposed in the same and extending through a wall thereof, and means for exhausting the fluid contents of said casing, of fluid-sealing means interposed between said casing and shaft, and means associated with said fluid-sealing means for effecting movement of the same into or out of sealing relation with respect to said casing and shaft.

5. The combination with compressor apparatus including a casing, an operating shaft disposed in the same and extending through a wall thereof, and means for exhausting the fluid contents of said casing, of fluid-sealing means interposed between said casing and shaft and including valve means disposed about said shaft at said wall and arranged for seating on said shaft with the pressure exteriorly of said casing, and means for effecting movement of said valve means into or out of firm seating engagement with respect to said shaft.

6. The combination with compressor apparatus including a casing, an operating shaft disposed in the same and extending through a wall thereof, and means for exhausting the fluid contents of said casing, of fluid-sealing means interposed between said casing and shaft and including a flexible annular element disposed about said shaft with its outer edge in sealing relation with respect to said casing and with its inner edge flexed outwardly beyond the plane of the outer edge and engaging said shaft by virtue of such flexure, and means cooperable with said element for increasing the degree of flexure thereof to place said inner edge into firm sealing relation with respect to said shaft.

7. The combination with compressor apparatus including a casing, an operating shaft disposed in the same and extending through a wall thereof, and means for exhausting the fluid contents of said casing, of flexible means interposed between said casing and shaft at said wall and operating upon being flexed to provide a fluid-seal between said casing and shaft, an element disposed about said shaft for movement axially thereof and cooperable with said means upon such movement to flex the latter into sealing position, and means cooperable with said element for effecting such movement thereof.

8. The combination with compressor apparatus including a casing, an operating shaft disposed in the same and extending through a wall thereof, and means for exhausting the fluid contents of said casing, of sealing means interposed between said casing and shaft and supported for movement into and out of sealing relation with respect thereto, and actuating means for said sealing means comprising a part disposed around said shaft for movement axially thereof and for engagement with said sealing means upon such axial movement to effect movement of the latter into sealing position and a second part disposed about said shaft for rotary movement about the axis thereof and for coaction with said first-named part upon such rotary movement to effect such axial movement of the latter.

9. The combination with compressor apparatus including a casing, an operating shaft disposed in the same and extending through a wall thereof, and means for exhausting the fluid contents of said casing, of means interposed between said casing and shaft and including an element arranged about said shaft for clamping engagement therewith and operable upon such engagement to provide a fluid-seal between said casing and shaft and means cooperable with said element to effect movement thereof into or out of such engagement with said shaft.

In testimony whereof I have hereunto subscribed my name at Zurich, Switzerland, this 27th day of July, A. D. 1926.

W. van RIJSWIJK.